July 3, 1956      M. R. RICHMOND      2,753,551
CIRCULARLY POLARIZED RADIO OBJECT LOCATING SYSTEM
Filed June 20, 1951
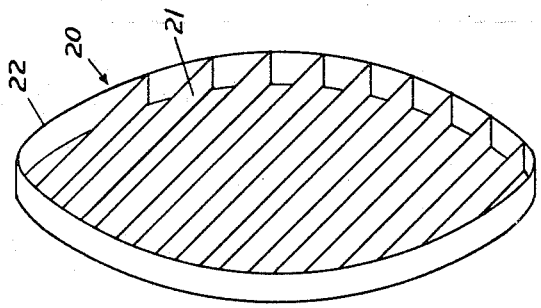
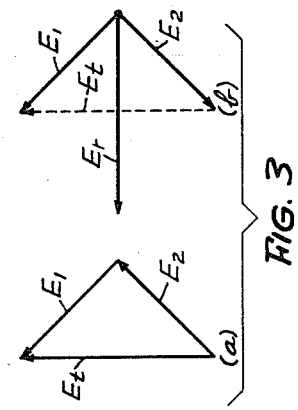
FIG. 3
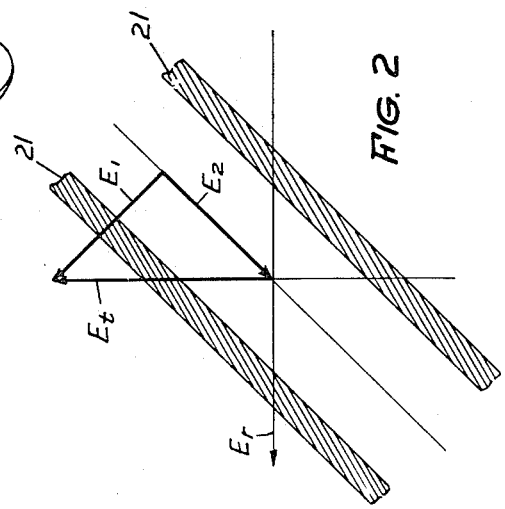
FIG. 2
FIG. 1
INVENTOR
MARTIN R. RICHMOND
BY
ATTORNEY

# United States Patent Office 2,753,551
Patented July 3, 1956

2,753,551

CIRCULARLY POLARIZED RADIO OBJECT LOCATING SYSTEM

Martin R. Richmond, Cambridge, Mass., assignor to Raytheon Manufacturing Company, Newton, Mass., a corporation of Delaware Application June 20, 1951, Serial No. 232,530

6 Claims. (Cl. 343—5)

This invention relates to improvements in radio object locating systems utilizing a single antenna system for the transmission and reception of circularly polarized radio energy with the phase-shifting device positioned ahead of the antenna.

In such systems, some means must be provided to prevent the transmitted energy feeding back to the detector in sufficient amplitude to blanket the received signal. This has been done by some form of transmit-receive or TR switching device. This has also been done by the use of a directive coupling device, such as the so-called magic tee, in the wave guide transmission line. It has also been done by inserting a phase shifting device within the wave guide system in such a manner as to circularly polarize the outgoing energy.

With a system using a rotating unsymmetrical antenna structure for lobing purposes, there are certain varying reflections of transmitter energy through the shaft and bearing of the spinning antenna structure caused by vibrations that can not be entirely removed. When these varying reflections reach the receiver they give erroneous signals, and thus should be prevented from entering the receiver. Such reflections have substantially the same polarization as the transmitted energy but are not removed from the received signal by a system that effects circular polarization within the wave guide for the reason that this portion of the reflected transmitted energy passes through any phase-shifting device inserted in the wave guide system in at least one direction, and thus is in proper polarization to be detected by the receiver. By the present invention this is avoided by positioning the phase-shifting device, such as a slatted lens, out in front of the antenna system with the result that the reflections caused by microphonics do not arrive at the detector in proper polarity to be detected and confused with the desired signals.

Other and further objects, advantages and features of the invention will become apparent from the following description of three embodiments thereof, reference being had to the accompanying drawings, wherein:

Fig. 1 is an isometric view of an embodiment of the invention utilizing a slatted lens;

Fig. 2 is a diagram representing a portion of the slatted lens with the electrical vectors to illustrate the principle of the invention; and Figs. 3a and b are a series of vector diagrams illustrating the operation of the invention.

In Fig. 1, the reference numeral 10 represents a wave guide shown as having a square cross section although it may be of any cross section that will permit the transmission of both vertically and horizontally-polarized wave energy. One branch 11 of this wave guide 10 feeds energy from an oscillator 110 into the main wave guide. This energy is vertically polarized. Another branch 12 of this wave guide 10 feeds energy to a detector 120 which may be of any standard type. This branch 12 is so dimensioned as only to admit horizontally-polarized energy; that is, the dimension transverse of the wave guide 10 is less than a half wave length, whereas the dimension along the wave guide is greater than a half wave length of the desired wave. A disk-shaped reflector 13 is positioned before the open end of the wave guide 10 and eccentrically mounted on the end of a shaft 14 of dielectric material supported in the wave guide 10 by bearings 15 and 16, and rotated by a motor 17. The energy reflected by reflector 13 is directed against a reflector 18 which again reflects it through a slat lens system 20. The eccentricity of the rotating reflector 13 does not effect the polarization of the energy, but shifts the resulting beam at an angle to the axis of the system and by its rotation generates a cone of energy. This lens 20 is formed of slats 21 set at a 45 degree angle to the electrical vector of the transmitted energy in a frame 22. The slats 21 can be either of a conductive material or of a dielectric with a considerably greater dielectric constant than air.

How this lens system 20 effects circular polarization can best be seen from Figs. 2 and 3. Fig. 2 shows a part of two slats 21 of the lens system 20 and various vectors and reference axes. The electrical vector of the transmitted wave is represented by the vertical line $E_t$. Two vectors $E_1$ and $E_2$ at right angles to each other can be found whose vector sum is $E_t$.

As shown in Figs. 3a and b, if one of these vectors, $E_2$ for instance, is shifted 90 degrees in time phase, the vector $E_1$ will be maximum when the vector $E_2$ is zero and vice versa. The vector sum of two components 90 degrees apart in time phase is a rotating vector. This phase-shifting action is accomplished by the effect of the metallic slats 21 in retarding the phase velocity of the electrical component $E_2$ parallel to the plane of the slats 21. The same effect can also be accomplished by the slats 21 if they are of a dielectric constant considerably greater than that of air. Such slats will accelerate the phase velocity of the vector parallel to the slats and again produce two components 90 degrees apart in time phase resulting in a rotating vector. It is obvious that, to accomplish this purpose by either dielectric or conductive slats 21, these slats must have a dimension in the direction of propagation that will bear the proper relation to a wave length to produce the desired phase shift. This dimension is approximately a quarter wave length.

The result of either type of phase shifter is to produce circularly-polarized resultant energy.

Most targets will not produce a radical shift in the plane of polarization of the reflected energy which can be assumed to return to the antenna wave guide system with essentially the same polarization with which it was radiated. Therefore, the component of this energy whose vector was previously influenced by the phase shifter is again shifted 90 degrees in time phase, producing a total of 180 degrees phase shift for this component. From Fig. 3b, it is evident that if $E_2$ is shifted 180 degrees in time relationship to $E_1$, then $E_2$ will be maximum in the negative or reverse direction when $E_1$ is maximum, as shown. The vector sum of these two components, that is, the vector $E_r$ in Fig. 3b, is now rotated 90 degrees in space relationship to the original energy, the vector $E_t$ produced by the oscillator. Since the square wave guide 10 will sustain propagation in either plane of polarization, the received signal $E_r$ travels down the system and is accepted by a guide configuration responsive only to this polarization, in this case the detector branch 12. This is because the guide 12 presents its axis to a vertically-polarized wave and its cross section to a horizontally-polarized wave. Thus only the reflected energy will be received and detected.

As previously explained, antenna 13 rotating on its shaft 14, which is carried through the reflector by bearing 16 and supported in the wave guide 10 by bearing 15, creates certain undesired reflections of the transmitted energy. It has been found that these reflections are polarized substantially in the same plane as the transmitted energy. If a phase shifter of the type disclosed in Figs. 1 and 4 of the application for U. S. patent, Serial No. 130,239 of Daniel Blitz, filed November 30, 1949, now Patent No. 2,683,855, issued July 13, 1954, were inserted in the wave guide between the antenna 13 and the detector branch 12, the reflections from the bearing 16, which would be on the antenna side of the detector branch 12, would pass through the phase shifter twice and reach the detector branch 12 in proper polarity to be accepted by it.

A vertical electrical component $E_t$ from the oscillator may, as before, be considered as the vector sum of two vectors $E_1$ and $E_2$ at right angles to each other. The vector $E_2$ that is parallel to the plane of the phase shifter, in this case assumed to be a single slat placed at a 45 degree angle in the wave guide, is accelerated or retarded in time phase with the vector $E_1$ as explained above to create a rotating vector. This results in the radiating energy being circularly polarized as before. However, this takes place before the energy reaches the bearing 16 and is reflected by it. Therefore, the signals reflected by the bearing 16 are circularly polarized like the desired reflected signals. When they return through the phase shifter, they are shifted from vertical to horizontal polarization like the desired signals and are received by the detector arm 12 like the desired signals.

With the phase-shifting device 20 positioned ahead of the antenna, the reflections from the bearing 16 are not shifted by the lens 20 to the polarity and phase necessary to affect the detector because they never reach the lens 20. They remain in the polarity of the transmitted energy and are rejected by the detector branch 12, as they are in the wrong plane like any other feedthrough signal from the transmitter. Thus, transmitted energy reflected by the antenna wave guide structure is not in proper polarity to be accepted by the detector branch 12 and so cannot cause confusion with the desired reflected energy.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In a radio object locating system comprising in combination, a hollow wave guide, an antenna coupled to one end of said wave guide, means for providing at said one end of said wave guide a linearly-polarized high frequency signal, means positioned beyond said antenna constructed and arranged to convert said linearly-polarized signal into a signal having a substantial degree of elliptical polarization, and to reconvert said high frequency signal after reflection from an object to be located into a signal linearly-polarized in a direction substantially at right angles to the original linearly-polarized signal and a detector means receptive only to signals polarized in the second-mentioned direction.

2. In a radio object locating system, a rotating reflector comprising an eccentrically mounted conductive disc, a wave guide adapted to transmit radio energy with all angles of polarization, means coupled to the wave guide for generating radio energy of one polarization, means coupled to the wave guide for detecting radio energy of an angle of polarization at substantially 90 degress to that of the generator, means beyond the antenna for shifting a component of the transmitted energy approximately 90 degrees in time phase with respect to a component of the transmitted energy.

3. In a radio object locating system, an antenna, a wave guide adapted to transmit radio energy with all angles of polarization, means coupled to the wave guide for generating radio energy of one polarization, means coupled to the wave guide for detecting radio energy of an angle of polarization at substantially 90 degrees to that of the generator, means beyond the antenna for retarding the phase velocity of a component of the transmitted energy approximately 90 degrees in time phase with respect to a component of the transmitted energy.

4. In a radio object locating system, an antenna, a wave guide adapted to transmit radio energy with all angles of polarization, means coupled to the wave guide for generating radio energy of one polarization, means coupled to the wave guide for detecting radio energy of an angle of polarization at substantially 90 degrees to that of the generator, means beyond the antenna for retarding the phase velocity of a component of the transmitted energy approximately 90 degrees in time phase with respect to a component of the transmitted energy, said means comprising a plurality of conductive slats arranged in parallel planes at a 45 degree angle to the electrical vector of the transmitted energy.

5. In a radio object locating system, an antenna, a wave guide adapted to transmit radio energy with all angles of polarization, means coupled to the wave guide for generating radio energy of one polarization, means coupled to the wave guide for detecting radio energy of an angle of polarization at substantially 90 degrees to that of the generator, means beyond the antenna for accelerating the phase velocity of a component of the transmitted energy approximately 90 degrees in time phase with respect to a component of the transmitted energy.

6. In a radio object locating system, an antenna, a wave guide adapted to transmit radio energy with all angles of polarization, means coupled to the wave guide for generating radio energy of one polarization, means coupled to the wave guide for detecting radio energy of an angle of polarization at substantially 90 degrees to that of the generator, means beyond the antenna for accelerating the phase velocity of a component of the transmitted energy approximately 90 degrees in time phase with respect to a component of the transmitted energy, said means comprising a plurality of dielectric slats arranged in parallel planes at a 45 degree angle to the electrical vector of the transmitted energy.

References Cited in the file of this patent

UNITED STATES PATENTS

| | | |
|---|---|---|
| 2,129,712 | Southworth | Sept. 13, 1938 |
| 2,235,010 | Chaffee | Mar. 18, 1941 |
| 2,502,394 | Smith | Mar. 28, 1950 |
| 2,562,277 | Kock | July 31, 1951 |
| 2,573,746 | Watson | Nov. 6, 1951 |
| 2,607,849 | Purcell | Aug. 19, 1952 |
| 2,637,847 | Affel et al. | May 5, 1953 |

FOREIGN PATENTS

| | | |
|---|---|---|
| 668,231 | Germany | Nov. 28, 1938 |